United States Patent Office 3,556,891
Patented Jan. 19, 1971

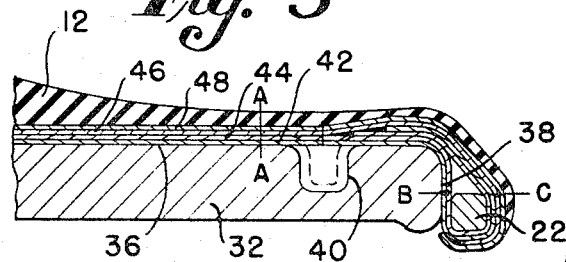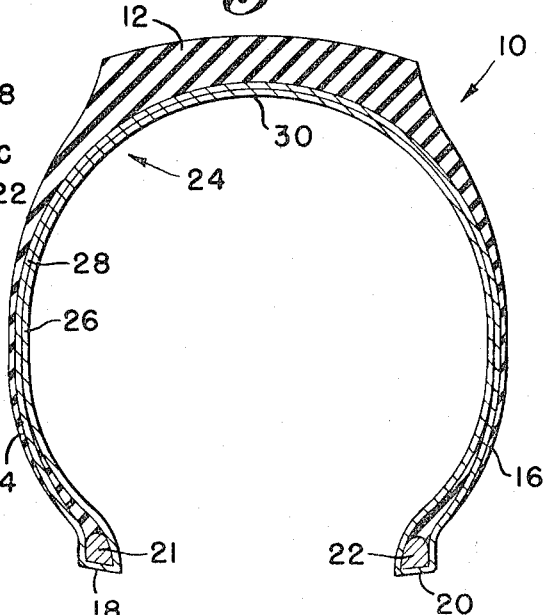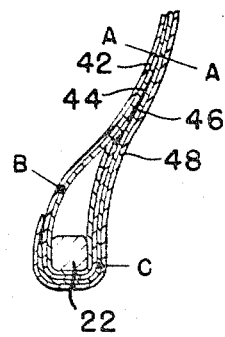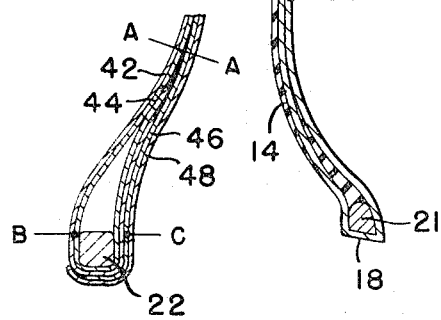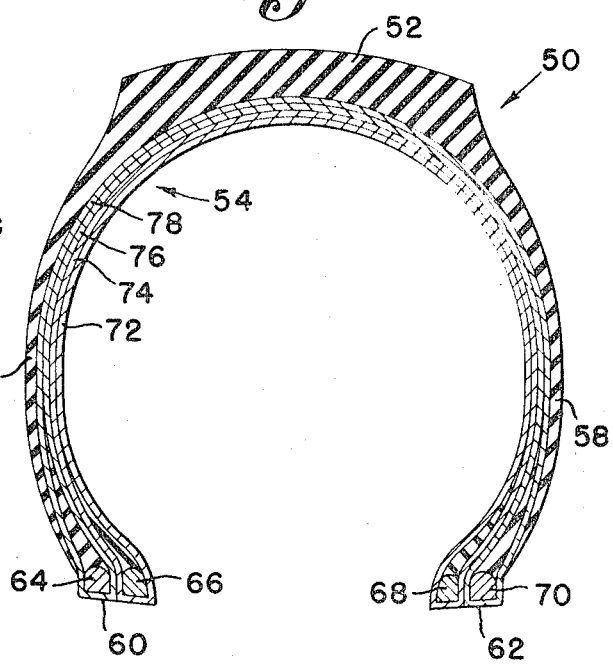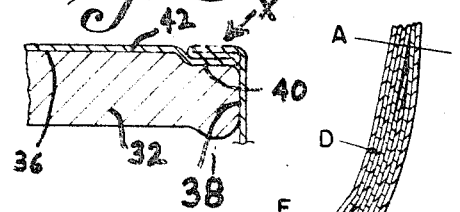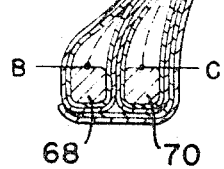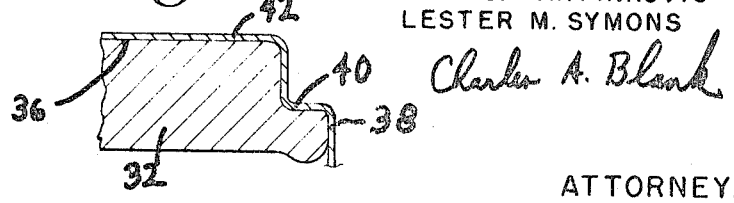

3,556,891
PNEUMATIC TIRE METHOD OF FABRICATION AND INTERMEDIATE ARTICLE
Paul S. Martinkovic, Detroit, and Lester M. Symons, Southfield, Mich., assignors to Uniroyal, Inc., New York, N.Y., a corporation of New Jersey
Continuation of application Ser. No. 553,352, May 27, 1966. This application Apr. 21, 1969, Ser. No. 829,150
Int. Cl. B29h *17/20;* B60c *9/04*
U.S. Cl. 156—132                        26 Claims

ABSTRACT OF THE DISCLOSURE

The method of manufacturing a pneumatic multi-ply tire on a shoulder drum having a circumferentially extending groove therein comprising the steps of forming a tire carcass by disposing at least the innermost ply of reinforcing material about the drum surface and into the groove, and disposing at least the outermost ply of reinforcing material in surrounding relation to the inner ply and bridging the groove and placing the carcass in a mold for final forming.

---

This is a continuation of our copending application Ser. No. 553,352, filed May 27, 1966.

This invention relates to a method of making pneumatic tires and particularly to a method of making pneumatic tires on a shoulder drum. Most particularly the present invention is directed to a method of making multiple bead pneumatic tires on a shoulder drum.

It is well known to form the carcass of a tire by laying a plurality of piles of solutioned and skimcoated tire fabric on the surface of a drum, wrapping the ends of said plies about bead wires along each circumferential edge of the drum, then temporarily bonding the assembly together as by "stitching," then collapsing the drum to permit the removal of the stitched carcass, and then shaping the stitched carcass substantially into the final shape of a tire and placing it in a mold where it is subjected to heat and pressure to cure the rubber and complete the tire. In performing this well known method, it has been found that during two portions of the method the inner ply or plies forming the carcass tend to be stretched far more than the outer plies whereby to subject the inner plies to a substantial degree of tension while leaving the outer plies substantially unstretched. The unequal stretching, as just noted, occurs at two steps in the method. The first step at which unequal stretching occurs is during the step when the substantially flat carcass is removed from the drum and formed into approximately the final shape of the tire. An analysis of the geometry of the configuration of the tire will clearly establish that in the conventional tire the inner ply is stretched more than the outer ply. The second point at which additional stretching of the inner ply occurs is during the curing step when all of the plies are subjected to radial compressive forces. The outer plies which are up against the non-yielding mold, cannot move during this compressive step. However the inner plies which are bearing against the compressible adjacent outer plies are permitted thereby to move a discrete distance, which movement will cause additional stretch on the inner plies. The unequal stretching of the inner and outer plies leads to an unequal sharing of load during use of the tire whereby to render it less effective than is potentially possible in a multi-ply carcass tire.

While the above conditions are present to a certain degree in tires having a single bead wire assembly at each side, in the heavy-duty multiple bead tire the strain differential between the inner and outer plies is greatly increased. Accordingly the present invention will perhaps find its greatest utility in the manufacture of multiple bead tires.

The main object of the present invention is the provision of a new and improved method of making tires in which the inner and outer plies of the carcass are substantially equally strained.

Another object of the present invention is the provision of a new and improved method of making a multiple bead tire in which inner and outer plies are substantially equally strained.

Yet a further object of the present invention is the provision of a new and improved method of making a tire on a shoulder drum, which tire will be so formed that the inner and outer plies of the carcass will be substantially equally strained.

A still further object of the present invention is the provision of a new and improved method of making a multiple bead tire without employing the use of a conventional undercut drum, which tire will be so fabricated that the plies can be easily manipulated and the inner and outer plies of the formed tire will be substantially equally strained.

The above and other objects, characteristics and features of the present invention will be more fully understood from the following description taken in connection with the accompanying illustrative drawings.

In the drawings:

FIG. 1 is a transverse sectional view of a single bead tire;

FIG. 2 is a view similar to FIG. 1 showing a dual bead tire;

FIG. 3 is a transverse sectional view of a carcass in formation on a shoulder drum employed in the present invention, the carcass being formed in accordance with the present invention (dotted lines) and also in accordance with the prior art (solid lines);

FIG. 4 is a fragmentary transverse sectional view of the caracss of the tire of FIG. 3 made in accordance with the prior art method;

FIG. 5 is a view similar to FIG. 4 but showing the tire made in accordance with the present method;

FIG. 6 is a view similar to FIG. 3 showing the carcass of a dual bead tire on a shoulder drum of the type used in the present invention, the tire being formed in accordance with the present invention;

FIG. 7 is a view similar to FIGS. 4 and 5 showing a portion of the carcass of a dual bead tire as formed in accordance with the present invention after being constructed in the manner of FIG. 6;

FIG. 8 is a transverse sectional view of a modification showing the carcass ply folded into a shallow step-off to practice the invention; and FIG. 9 is also a transverse sectional view of another modification wherein the carcass ply is pressed into a deep angular step-off in order to practice the invention.

A single bead tire 10 is illustrated in FIG. 1 and has a tread 12, sidewalls 14 and 16 and beads 18 and 20. The beads are formed about bead wires 21 and 22. Reinforcing the tire and giving it its strength is the carcass 24 made of a plurality of fabric layers or plies (here shown as two in number) 26 and 28 which plies extend around the bead wires 21 and 22 and underlie the sidewalls 14 and 16 and the tread 12. In the event the tire 10 is a tubeless tire, the inner surface is lined with an air impervious rubber liner 30. The liner may be omitted in the case of a tubed tire.

As previously stated in the remarks, the present invention contemplates building the carcass of the tire on a shoulder drum, an edge portion of which is shown in FIG. 3. The shoulder drum 32 includes an upper plane cylindrical supporting surface 36 which terminates in a vertical shoulder edge 38. Provided in the outer cylindrical surface 36 of the drum 32 is a circumferentially extending groove 40. As shown in FIG. 3 it is presently preferred to include two grooves 40, one adjacent each shoulder 38. However, if desired, a single shoulder groove may be employed and the groove may be disposed in a median portion of the drum surface 36 rather than near a peripheral edge thereof.

Excepting for the inclusion of the grooves 40, the drum 32 is substantially indentical to a conventional shoulder drum as presently employed in manufacturing tires. A conventional shoulder drum would exclude the grooves 40. The conventional method of making tires is illustrated in FIGS. 3 and 4 in connection with a four-ply tire. In such conventional method the inner plies 42 and 44 are laid over the flat drum surface and around the shoulders and the outer plies 46 and 48 are similarly applied, the application being done either manually or by machine. The ends of the plies are formed around the bead wire 22 with the inner plies being turned up toward the outside, and the outer plies being turned down. The assembled carcass is then stitched. The tread 12 overlies the outer ply 48 as illustrated. After stitching, the drum 32 is collapsed and the carcass is removed and formed substantially into the shape of the tire 10 of FIG. 1 in order to be placed in a mold. In FIG. 3 it will be seen that the mean carcass line of the inner plies, that is the line AB, is substantially shorter than the mean carcass line of the outer plies, that is the line AC. However, in a single bead tire this differential in length is normally compensated for by bead rotation, that is by a shifting of relative position of the points B and C with respect to the bead wire 22 as illustrated in FIG. 4. While this is not possible in a dual bead tire, it does yield a single bead tire with substantially equally stressed plies.

The present method of building a multiple bead tire is by fabricating the components on a conventional undercut drum which is larger in diameter than a shoulder drum. The building surface of the undercut drum is radially farther from the bead wire assembly than the building surface of the shoulder drum. This dimensional difference results in time consuming manipulation of the ply edges to properly distribute the folds around the beads.

However, if the same drum 32 were employed to make a multiple bead tire, that is a tire in which there are two side-by-side bead wires, the phenomenon of bead rotation cannot take place. Thus the points B and C of FIGS. 3 and 4 in a multiple bead tire would remain relatively fixed with respect to the beads which would necessitate a substantial stretching of the line AB along the inner plies 42 and 44 and the possible concomitant compression or wrinkling of the outer plies 46 and 48 which would result in unequally stressed plies. It is this phenomenon which the present invention is directed to overcome, especially with respect to multiple bead tires.

Referring now to FIG. 2, a multiple bead tire 50 is illustrated which tire has a tread 52 and a carcass 54, the carcass comprising sidewalls 56 and 58 and associated dual beads 60 and 62. The bead 60 includes a pair of circumferentially extending side-by-side bead wires 64 and 66 and the bead 62 includes a similar pair of circumferentially extending side-by-side bead wires 68 and 70. The carcass 54 includes a multiplicity of plies of reinforcing fabric here shown as four in number which are designated 72, 74, 76 and 78.

A tire similar to the tire 50 but having six plies is shown being built on a shoulder drum 32 in the schematic drawing FIG. 6. Referring now to FIG. 6, the multi-bead tire is manufactured by laying over the surface of the drum 36 the inner plies 80 and 82 which inner plies, for reasons which become apparent hereinafter, not only extend over the flat surface 36 of the drum and around the shoulder 38 thereof, but portions thereof are pressed into grooves 40 in the upper surface 36. The remaining plies 84, 86, 88 and 90 are laid on the drum and are shown here to bridge the grooves 40. The ends of the plies are wrapped around the bead wires 68 and 70 in a conventional manner with the inner plies turned up around the inner bead wire 68 and the third and fourth plies turned up around the outer bead wire as shown with the remaining outer plies turned down. The tread 52 is placed over the outer ply 90. Thereafter the carcass is stitched in the conventional fashion and the drum is collapsed to permit the removal of the carcass therefrom.

It will be seen that the mean carcass line of the inner plies 80 and 82 would be significantly shorter than the mean carcass line of the outer plies 84, 86, 88 and 90 if portions of the inner plies had not been pressed into the grooves 40. That is to say the line AD plus EB, which would be equal to the mean carcass line in a conventionally processed tire, is substantially shorter than the line AC. Thus if the plies 80 and 82 were not widened by the distance DE resulting in the disposition of the plies 80 and 82 into the grooves 40, when the carcass is removed from the drum and formed into the tire shape and cured in the tire mold, the inner plies 80 and 82 would be significantly stretched in order to maintain the relative positions of the points B and C with respect to the bead 62. This stretching would also result in a wrinkling or compression of the outer plies 84, 86, 88 and 90. Thus there would be an unequal tensioning of the six plies of the tire 50.

However, as already described the inner plies 80 and 82 have been disposed in the grooves 40 thereby widening these plies by a predetermined amount DE which additional amount is equal to the difference between the line AD plus EB and the line AC. Accordingly, the builder has made available in the preshaped condition of the carcass the necessary additional amount of inner ply material to compensate for the differential between the median carcass line AD plus EB and the median carcass line AC.

Therefore, when the drum 32 is collapsed to permit the removal of the carcass and the shaping of the carcass into toroidal shape, rather than having to tension the inner plies 80 and 82 to maintain the fixed relative position of the points B and C, there is material available to compensate for the differential and yield and equally stressed multi-ply multi-bead tire as shown in FIG. 7.

While the drum 32 can be employed to make a single bead tire in a conventional manner as previously described in connection with FIGS. 3 and 4, by causing the inner ply to merely bridge the grooves 40, it has been found desirable to employ the method of FIGS. 6 and 7 in connection with the manufacture of some single bead tires as well as multiple bead tires, especially where the reinforcing ply is made of a low stretch fabric such as rayon and there is very little bead rotation. Such a method of manufacturing single bead tires is illustrated in dotted lines in FIG. 3 and in FIG. 5. In accordance with our novel method of manufacturing single bead tires, the inner plies 42 and 44 of the single bead tire being formed in FIG. 3 are disposed into the grooves 40, as shown in dotted lines, whereby to elongate the inner plies by a distance equal to the differential between the median carcass line AB and the median carcass line AC, the outer plies 46 and 48 being formed in the same manner as previously described without disposition within the grooves 40. Accordingly, when the single bead tire is formed into its final shape the additional material disposed within the grooves 40 will be brought into the smooth tire structure so that even though there is no bead rotation whereby to result in a fixed relative position between the points B and C and the bead wire 22, as best illustrated in FIG. 5. Accordingly, the drum 32 may be used to form single bead tires in either the conventional manner by bridging the grooves 40 or in the novel manner by employing the grooves 40 and, further, may be employed in connection with multiple bead tires where bead rotation is not available, and can also be used to make various other tires.

The specific dimensions of the groove or grooves 40 of the drum employed in connection with the present method have not been discussed as they vary from tire structure to tire structure. However it is a simple matter of geometric analysis to determine the necessary material differential between the mean carcass lines of the inner plies and the mean carcass lines of the outer plies and to proportion the groove to compensate for the differential in these two distances. However, it has been found that for a dual bead tire formed on a 20 x 2¼" shoulder drum, the order of magnitude of such a groove is one-half inch by one-half inch.

In this connection it should be recognized that the cross-sectional shape of the groove is not critical and that any conveniently machined cross-sectional shape, capable of accommodating the desired additional width of material may be employed in the practice of this invention. Moreover, while it is convenient to proportion the groove width so as to give an automatic compensation for inner ply elongation during the shaping and molding of the tire, the groove could be constructed oversized and the inner plies be disposed only partially within the groove. While such an arrangement is not as desirable as that described, such a practice would come within the scope of this invention.

In the embodiments of the invention illustrated in FIGS. 3 and 6, the circumferential grooves 40 have been shown to be in the cylindrical portion of the supporting surface for the carcass. However, the groove can be immediately adjacent or even in the shoulder 38 without departing from the invention. Such modifications are shown in FIGS. 8 and 9. Referring to FIG. 8 the groove 40 is provided at the juncture between the cylindrical surface 36 and the shoulder 38 so that the groove has only one side wall and a bottom. As shown in FIG. 8, the groove is very shallow so that it becomes necessary to fold the inner ply 42 back on itself as shown at location $x$. The amount of extra material provided by the wall will be the amount necessary to compensate for the difference in length between the inner and outer plies. Preferably, as shown, the fold of extra material will fill up shallow groove 40 and thereby insure that the outer plies will be proportioned as if the groove didn't exist.

Referring now to FIG. 9 a significantly deeper groove 40 is provided at the juncture between the cylindrical supporting surface portion 36 and the shoulder 38 of the drum 32. The inner ply 42 is made to conform to the contour of the shouldered surface as illustrated. The outer plies, which are not shown in FIG. 9, are caused to bridge the groove 40 diagonally whereby to provide for excess material in the ply 42 to compensate for the stretching during the formation of the tire. Thus it will be seen, as already suggested, that there is wide variety of locations where the groove or grooves 40 can be provided to afford the opportunity for compensation for length differential. The illustrated locations while presently preferred also serve as examples and are not intended to limit the location of the groove 40 in the drum surface.

It will also be recognized that if a liner is incorporated in a tire made in accordance with the present invention the liner will also be disposed in the groove or grooves 40 as it underlies the innermost ply of the carcass of such a tire.

It is to be understood that the reference to inner and outer plies not only refers to the location in the body of the tire carcass but also to relation with the bead construction. In the case of a single bead wire assembly, the inner ply or plies would be turned up around the bead wire and the outer ply or plies turned down around the bead wire. When dual bead wire assemblies are incorporated, the inner ply or plies are those that would engage the bead wire closest to the drum shoulder and the outer ply or plies would be those that engage the bead wire further from the drum shoulder. In the particular construction described the third and fourth carcass plies or the first pair of outer plies are turned up around the second bead wire and the fifth and sixth carcass plies or the second pair of outer plies would be turned down around both bead wires.

While we have herein shown and described the preferred form of the present invention and have suggested modifications thereof, other changes and modifications may be made therein within the scope of the appended claims without departing from the spirit and scope of this invention.

Having thus described our invention, what we claim and desire to protect by Letters Patent is:

1. The method of manufacturing a pneumatic multiply tire on a drum having a cylindrical supporting surface having a circumferentially extending groove therein, said method comprising the steps of forming a tire carcass having inner and outer plies by disposing at least an inner ply of reinforcing material about said supporting surface and into said groove, and disposing at least an outer ply of reinforcing material in surrounding relation to the inner ply and bridging said groove, at least a portion of said inner ply in said groove being out of contact with said outer ply, and forming said carcass into toroidal shape resulting in movement of said out of contact portion of said inner ply into substantial conformity with said outer ply.

2. The method of claim 1 performed on a shoulder drum having a pair of circumferentially extending grooves in said supporting surface, one adjacent each shoulder, wherein said inner ply is disposed in both said grooves and said outer ply bridges both said grooves.

3. The method of claim 1, wherein the transverse width of said inner ply disposed within said groove is substantially equal the difference between the mean carcass length of said inner ply on the drum and the mean carcass length of said inner ply after final forming.

4. The method of claim 2, wherein the transverse width of said inner ply disposed within said grooves is substantially equal the difference between the mean carcass length of said inner ply on the drum and the mean carcass length of said inner ply after final forming.

5. The method of claim 2 in which bead wires are incorporated in the edges of said carcass by wrapping the ends of the inner plies around said bead wires from the inside of the tire to the outside thereof and by wrapping the ends of said outer plies in the opposite directions, and in which all of said inner plies are disposed within said grooves.

6. The method of claim 5, wherein all of said outer plies are disposed in bridging relation with said grooves.

7. The method of claim 2, in which a pair of side-by-side bead wires are incorporated into each edge of said carcass by wrapping the inner plies at least partially around the innermost bead wire of each pair thereof from the inside of said inner bead toward outer side thereof.

8. The method of claim 1 performed on a shoulder drum having a pair of circumferentially extending grooves in said supporting surface, one at the juncture of said cylindrical drum portion and each shoulder, wherein the innermost ply is disposed in both said grooves and the outermost ply bridges both said grooves.

9. The method of claim 8, wherein said innermost ply is disposed in said grooves by folding said ply, and disposing said folded innermost ply within said grooves, and the depth of said grooves is proportioned so that said grooves will be filled by said folded ply to insure that the other plies will bridge said grooves.

10. In a method of fabricating the carcass of a multiply pneumatic tire having a pair of axially spaced bead rings, the steps of:

forming a substantially cylindrical inner ply means with a circumferentially extending creased portion located intermediate said bead rings;

forming a substantially cylindrical outer ply means over and in surrounding relationship with said inner ply means and having a circumferential portion bridging said creased portion, said creased portion being of such configuration that at least a portion thereof is out of contact with said bridging portion of said outer ply means; and, thereafter, forming said carcass into toroidal shape, said last named step causing extension of said inner ply means transversely wth respect to said creased portion and movement of said out of contact portion of said creased portion of said inner ply means into at least partial contact with said bridging portion of said outer ply means.

11. The method according to claim 10 wherein there is formed between said creased porton and the portion of said outer ply means bridging said creased portion an annular space.

12. The method according to claim 10 wherein both said inner and said outer ply means extend substantially the entire distance between said bead rings.

13. The method according to claim 10 wherein said outer ply means is devoid of a creased portion.

14. The method according to claim 10 wherein said forming of said inner ply means comprises forming an inner ply of reinforcing material into substantially cylindrical shape and thereafter forming said circumferentially extending creased portion in said inner ply.

15. The method according to claim 10 comprising forming said inner ply with an additional circumferentially extending creased portion, said outer ply means comprising at least one outer ply bridging both said creased portions.

16. As an intermediate article of manufacture, a multi-ply pneumatic tire carcass comprising, in combination:
cylindrical inner-ply means having intermediate the axially opposite ends thereof a circumferentially extending axially extensible creased ply portion; and
cylindrical outer ply means positioned on and surrounding said inner ply means, said outer ply means bridging said axially extensible creased ply portion, the latter at least partially straightening out in response to final forming of said carcass into toroidal shape to permit said inner ply means to substantially conform to the final formed shape of said outer ply means.

17. The intermediate article according to claim 16, wherein said creased ply-portion has, prior to final forming, a substantially U-shaped outwardly opening cross-section in a plane which includes the axis of said carcass.

18. The intermediate article according to claim 17 wherein said outer-ply means bridges the gap provided by said outwardly opening creased portion.

19. The intermediate article according to claim 18 wherein said creased portion and said outer ply means bridging the latter define between themselves an annular circumferentially extending space.

20. The intermediate article according to claim 16 comprising a second circumferentially extending axially extensible portion, said first mentioned and said second axially extensible portions being located adjacent said opposite ends, respectively, of said inner ply means.

21. The intermediate article according to claim 16 further comprising a pair of axially spaced coaxial bead means, each of said inner and outer ply means being fixed at opposite ends thereof, respectively, to said pair of bead means.

22. The intermediate article according to claim 21 wherein each of said pair of axially spaced bead means comprises a pair of annular axially spaced coaxial bead rings.

23. The intermediate article according to claim 22 wherein said pair of annular bead rings of each said bead means includes a first annular inextensible bead ring fixed to said inner ply means and a second annular inextensible bead ring fixed to said outer ply means, said first and second bead rings being of substantially equal diameter, and said second bead rings of said pair of bead means being spaced further apart than said first bead rings.

24. The intermediate article according to claim 16 wherein said creased portion comprises a circumferentially extending fold provided in said inner ply means.

25. The intermediate article according to claim 16 wherein at least a circumferentially extending portion of said creased portion is out of contact with said bridging portion of said outer ply means.

26. As an intermediate article of manufacture, an unvulcanized multi-ply cylindrical carcass prior to final forming into substantially toroidal shape, said carcass comprising an inner ply means having a cylindrical ply portion including a circumferentially creased portion and having a pair of coaxial inextensible annular bead rings connected respectively to opposite axial ends of said cylindrical portion; and
an outer ply means having an intermediate cylindrical ply portion positioned on and surrounding said cylindrical portion of said inner ply and bridging said creased portion, said outer ply means including a second pair of inextensible annular bead rings coaxial with but spaced further apart than, and including therebetween, said first mentioned pair of bead rings, the configuration of said creased portion being such that at least a circumferentially extending portion thereof is out of contact with said bridging portion of said outer ply means so that when said carcass undergoes final forming into said substantially toroidal shape causing extension of said inner ply means transversely with respect to said creased portion said out of contact portion of said inner ply means will move into at least partial contact with said bridging portion of said outer ply means.

References Cited

UNITED STATES PATENTS 607,245    7/1898    Jeffery _____ 152—354

FOREIGN PATENTS 700,790    12/1964    Canada _____ 152—354

BENJAMIN A. BORCHELT, Primary Examiner

S. C. BENTLEY, Assistant Examiner

U.S. Cl. X.R.

152—354; 156—133, 414